United States Patent [19]

Rink et al.

[11] Patent Number: 5,219,202
[45] Date of Patent: Jun. 15, 1993

[54] IMPACT RESISTANT VEHICLE SEAT FRAME

[75] Inventors: Manfred Rink, Cologne; Günther Lehnert, Leverkusen, both of Fed. Rep. of Germany

[73] Assignee: Bayer Aktiengesellschage, Fed. Rep. of Germany

[21] Appl. No.: 711,813

[22] Filed: Jun. 7, 1991

[30] Foreign Application Priority Data

Jun. 23, 1990 [DE] Fed. Rep. of Germany ....... 4020057

[51] Int. Cl.⁵ .............................................. B60N 2/42
[52] U.S. Cl. .................................... 297/216; 297/354
[58] Field of Search ............... 297/216, 452, 354, 440, 297/410; 16/86 R; 403/116

[56] References Cited

U.S. PATENT DOCUMENTS

| | | | |
|---|---|---|---|
| 1,978,249 | 10/1934 | Décarie | 16/86 R X |
| 1,981,283 | 11/1934 | Perry | 16/86 R X |
| 2,024,102 | 12/1935 | Kahn | 16/86 R X |
| 2,043,287 | 6/1936 | Dorton | 297/354 X |
| 2,703,601 | 3/1955 | Wood | 297/354 |
| 4,396,220 | 8/1983 | Dieckmann et al. | 297/216 X |
| 4,919,486 | 4/1990 | Chinomi et al. | 297/354 X |

*Primary Examiner*—James R. Brittain
*Assistant Examiner*—Milton Nelson, Jr.
*Attorney, Agent, or Firm*—Connolly & Hutz

[57] ABSTRACT

In vehicle seat frames the overload protection during the deformation of the brackets (4; 5) of the fittings (3) as a result of impact stresses includes a particular force path in that a fixed point connection (20) and a sliding connection (21) are formed by connecting bolts (9; 10, 22; 26) between at least one bracket (4; 5) of each fitting (3) and the lower seat part (1) or backrest (2).

9 Claims, 4 Drawing Sheets

IMPACT RESISTANT VEHICLE SEAT FRAME

BACKGROUND OF THE INVENTION

The invention relates to a vehicle seat comprising a lower seat part and a backrest, which are connected with one another via articulated joint fittings, the articulated joint fittings comprising brackets and each bracket being provided with two through holes arranged spaced apart in the longitudinal extension of the bracket, through which holes connecting bolts are guided and held in the lower seat part or backrest.

Vehicle seats for road vehicles, express rail vehicles, boats and aeroplanes need to be designed in such a manner that the vehicle seats absorb the acting forces in the event of a collision in order to protect the passengers. In the event of collisions of this type, the backrest, lower seat part and the articulated joint fittings connecting the backrest and the lower seat part and in particular the force introduction points on the connections are subject to particularly high stresses. The connection between the brackets, articulated joint fittings and the lower seat part or backrest is usually effected via connecting bolts, such as screw bolts or threaded studs. These days, vehicle seats of this type are fitted without exception with articulated joint fittings, since rigid backrests are now only accepted by purchasers for rear seats. In this case, a particularly good anchoring of the backrests is possible, so that it is not necessary to take additional safety measures. In the case of vehicle seats with free-standing backrests, i.e. those which are merely held via the fittings, the brackets of said fittings tend to buckle outwards under the effect of force, which automatically results in a shortening of the distance between the two securing points. This is particularly the case when the brackets are provided with intended deformation sites for the improved absorption of the acting forces. In the case of large acting forces, the fixing points of the connecting sites in the lower seat part or backrest can break away, resulting in a danger of injury to the passengers.

SUMMARY OF THE INVENTION

In the case of vehicle seats of the above type, it is the object of the invention to improve overload protection during the deformation of the brackets of the fittings as a result of impact stresses by means of a favourable force path.

This object is attained in that a fixed point connection and a sliding connection are provided by means of the connecting bolts between at least one bracket and the lower seat part or backrest.

In this manner it is ensured that, as a result of the sliding connection, the connecting bolts or their fixing points in the lower seat part and/or backrest are not additionally stressed in a distance- shortening manner. This means that when the bracket bulges outwards, the distance between the connecting bolts is maintained as a result of the sliding connection. This eliminates the danger of breakage. It is, of course, also possible to provide a plurality of connecting bolts instead of two per bracket. It is merely necessary to divide said connecting bolts between a sliding connection and a fixed point connection.

The sliding connection is usually associated with the backrest securing, whilst the securing of the lower seat part is formed by two fixed point connections. However, in special cases the reverse arrangement can be advantageous.

A particularly preferred embodiment which is also easy to realise is characterised in that the sliding connection is formed by a through hole designed as a slot and both connecting bolts are held securely in the lower seat part or in the backrest.

Conversely, the sliding connection can be formed by a sliding guide arranged in the lower seat part or backrest for a sliding member connected with the connecting bolt. The second embodiment is somewhat more complicated but nevertheless realisable in practical terms. In cases where the frame of the lower seat part or backrest is made of injection moulded plastics material, a sliding guide of this type can be directly formed in said frame. However, if the sliding guide should break in the extreme event of extremely high loading, then it is necessary to replace the entire frame. For this reason, it is more advantageous to fit a replaceable sliding guide, particularly where this is made of metal, since a sliding guide of this type can be designed in such a manner that, once a certain force is exceeded, it also experiences deformation for safety reasons, and is deformed in a desired manner. In this case, it would then only be necessary to replace the sliding guide where the latter can be easily secured by means of screws, for example.

According to a preferred embodiment, the connecting bolt comprises a head designed as a sliding member.

To this end, a screw with a head can be simply used, the width of the sliding guide being adapted to the width of the screw head. The sliding path of the sliding guide preferably has a T-shaped cross section. In this respect, it is not necessary for all circumferential surfaces to be designed as sliding surfaces.

In the embodiment with the slot, it is important for the guidance of the connecting bolt in the slot to be maintained during the buckling of the bracket, i.e. the outer covering of the slot by the head or nut of the connecting bolt needs to be sufficiently large, if necessary using the assistance of a packing washer. Special means of designing the sliding connection make it possible to influence to a large degree the path of force during the period of effect.

Usually, the slot or sliding guide extends in the plane of the two connections. By arranging the slot or sliding guide at an angle to the plane containing the connections, or by designing the slot or sliding guide in the form of a curve, it is already possible to obtain a desired damping effect. In this respect, where the sliding connection is associated with the backrest, the latter also changes its angle of inclination in the desired manner under the effect of force.

A further possibility of exerting influence on the path of force consists in that the slot or sliding guide is contoured.

A contouring of this type consists for example in that the slot or sliding guide narrows in the opposite direction to the force effect. Enlarged portions can be provided again in-between.

According to a further possibility of exerting influence on the path of force, the bracket is profiled in the region of the slot or the wall of the sliding guide.

The path of force can also be favourably influenced by the type of profiling. In this respect, the profiling has a reinforcing function in order to control the deformation, or is used to dampen the sliding movement as a result of the wedge-shaped thickening of the bracket or narrowing of the slide guide. In the first case, the head or nut of the connecting bolt travels upwards on this projection which rises in the shape of a wedge and in the second case the sliding member travels upwards. The wedge angle plays a part in determining the efficiency as well as the elastic deformability of the bracket or the wall of the sliding guide.

As a further variation, a flaring element arranged on the associated connecting bolt is guided in a slot, or the sliding member is designed as a flaring element.

In this respect, it is of course essential for the slot or sliding guide to narrow in the direction of loading by the flaring element.

It is particularly advantageous in the case of lower seat part frames or backrest frames made of plastics material or in the case of a lightweight metallic construction of the slot in the bracket to associate a relief plate preferably comprising a reinforcing corrugation with the securing sites of the connecting bolts in the lower seat part or backrest, the connecting bolts projecting through said relief plate.

A further variation is characterised in that a hard-elastic buffer is arranged in the slot.

A buffer of this type is made, for example, of a polyurethane elastomer having a suitable degree of hardness. It can also be made of layers of different hardnesses.

The new type of design can be used in a particularly advantageous manner for vehicle seats comprising fittings with intended deformation sites on the brackets, since in this case an outward buckling of the brackets in the event of a corresponding force effect is preprogrammed. Particularly advantageous is that in an emergency, neither the backrest nor the lower seat part is usually destroyed. After a force effect of this type, it is therefore only necessary to replace the fittings or, where these are correspondingly designed, to replace the deformed brackets.

BRIEF DESCRIPTION OF THE DRAWINGS

The new vehicle seat is explained in further detail in the following and is outlined purely schematically by way of a number of embodiments in the drawings, in which:

FIGS. 2 to 6 show various embodiments of the slot and profiling of

DETAILED DESCRIPTION OF THE INVENTION

Figure 1:
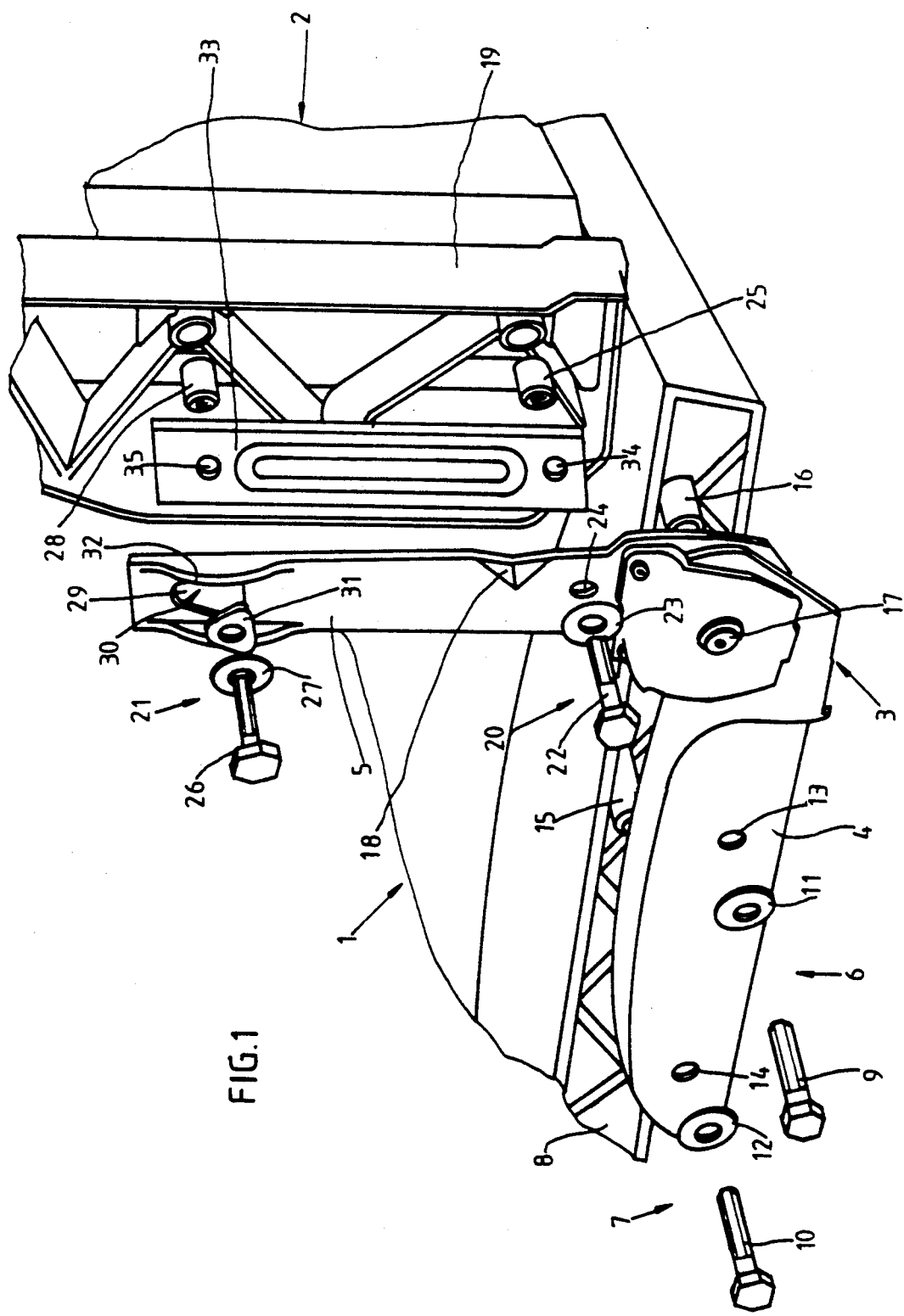
FIG. 1 is an exploded outline view of a first embodiment of the vehicle seat.

In FIG. 1 the vehicle seat comprises a lower seat part 1 and a backrest 2. Both are connected with one another by means of articulated joint fittings 3 (only one is shown). The articulated joint fitting 3 is provided with two brackets 4, 5, the bracket 4 being associated with the lower seat part 1 and the bracket 5 with the backrest 2. The bracket 4 is connected via two fixed point connections 6, 7 with the frame 8 of the lower seat part 1. The fixed point connections 6, 7 are formed by connecting bolts (screws) 9, 10, on which packing washers 11, 12 sit and which are guided through holes 13, 14 arranged in the bracket 4 and engage in the frame 8 in threaded sleeves 15, 16. The articulated joint is designated by the reference number 17. The bracket 5 comprises an intended deformation site 18 in the form of a crease and together with the frame 19 of the backrest 2 forms a fixed point connection 20 and a sliding connection 21. The fixing point connection 20 is formed by a connecting bolt (screw) 22 with a packing washer 23, a screw hole 24 in the bracket 5 and a threaded sleeve 25 cast-formed in the frame 19, in which the connecting bolt 22 engages. The sliding connection 21 also comprises a connecting bolt 26 with a packing washer 27 and a threaded sleeve 28 cast-formed in the frame 19 for the connecting bolt 26. The sliding connection 21 is formed in that a slot 29 is provided in the bracket 5 instead of a simple hole adapted to the diameter of the connecting bolt 26. The slot 29 has a triangular contour 30, in which a correspondingly shaped flaring element 31 engages. In the region of the slot 29, the bracket 5 has a reinforcing profile 32. A corrugated relief plate 33 comprising corresponding screw holes 34, 35 is provided between the bracket 5 and the frame 19.

Figure 2:
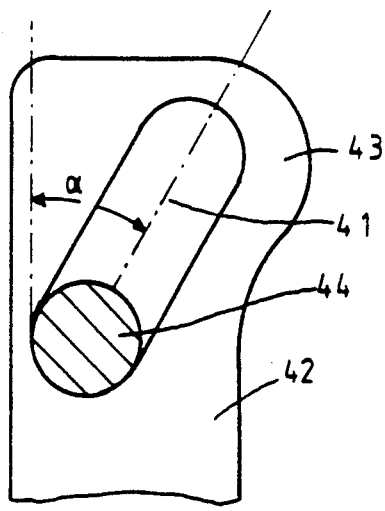

In FIG. 2, the slot 41 has a uniform width and is inclined at an angle $\alpha$ of 15° relative to the longitudinal direction of the bracket 42. The latter comprises a reinforcing profile 43. The connecting bolt is designated by the reference number 44.

Figure 3:
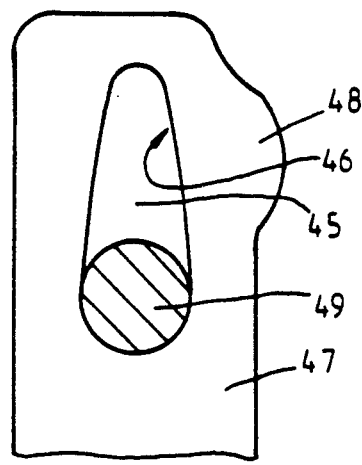

In FIG. 3, the slot 45 is provided with a narrowing contour 46 and the bracket 47 with a reinforcing profile 48. The connecting bolt is designated by the reference number 49.

Figure 4:
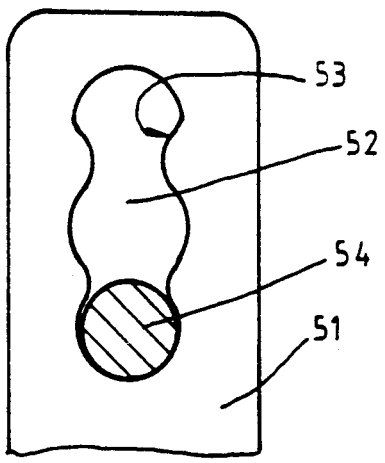

In FIG. 4, the slot 52 arranged in the bracket 51 has a sine curve-shaped defining contour 53. Accordingly, the width of said slot 52 is smaller in parts than the diameter of the connecting bolt 54.

Figure 5:
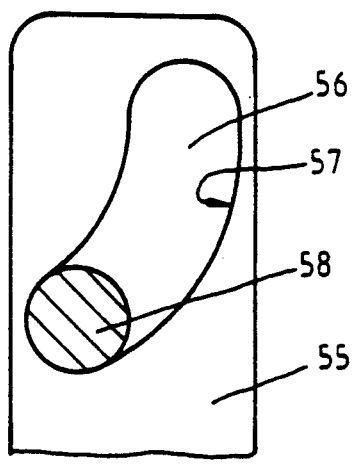

According to FIG. 5, the slot arranged in the bracket 55 has an arched contour 57. The connecting bolt is designated by the reference number 58.

Figure 6:
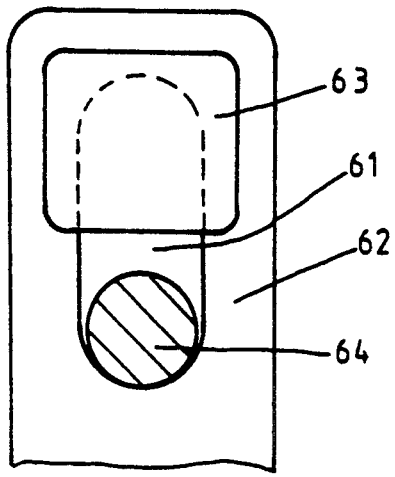

According to FIG. 6, a hard-elastic buffer 63 made of a polyurethane elastomer is arranged in the slot 61 of the bracket 62. The connecting bolt is designated by the reference number 64.

Figure 7:
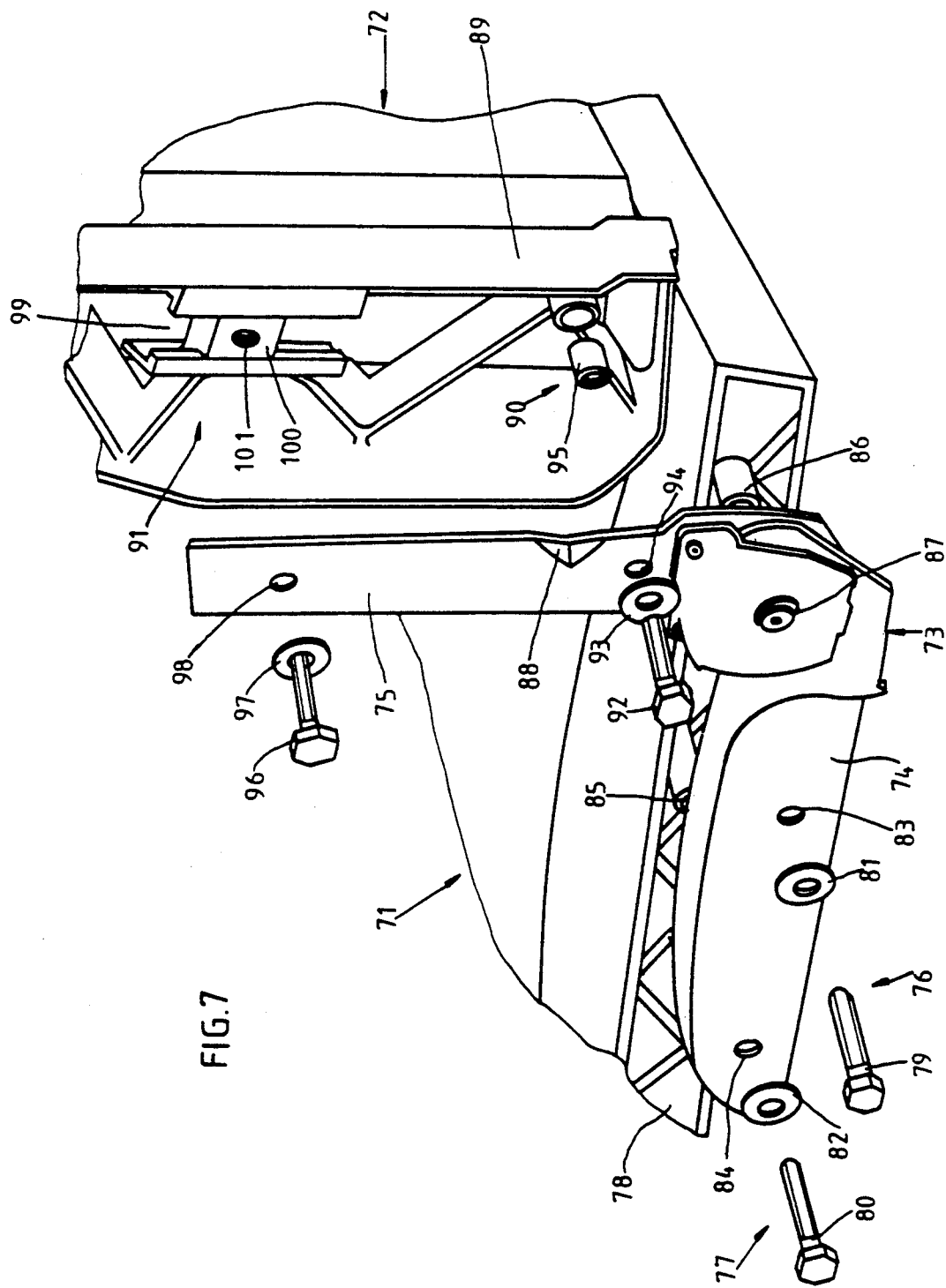
FIG. 7 is an exploded outline view of a vehicle seat according to a second embodiment and FIGS. 8 to 11 show various designs of sliding guides and their profiling.

In FIG. 7, the vehicle seat comprises a lower seat part 71 and a backrest 72. Both are connected with one another by means of articulated joint fittings 73 (only one is visible). The articulated joint fitting 72 is provided with two brackets 74, 75, the bracket 74 being associated with the lower seat part 71 and the bracket 75 with the backrest 72. The bracket 74 is connected via two fixed point connections 76, 77 with the frame 78 of the lower seat part 71. The fixed point connections 76, 77 are formed by connecting bolts (screws) 79, 80, on which packing washers 81, 82 sit and which are guided through holes 83, 84 arranged in the bracket 75 and engage in threaded sleeves 85, 86 in the frame 78. The articulated joint is designated by the reference number 87. The bracket 75 comprises an intended deformation site 88 in the form of a crease and together with the frame 89 of the backrest 72 forms a fixed point connection 90 and a sliding connection 91. The fixed point connection 90 is formed by a connecting bolt (screw) 92 with a packing washer 93, a screw hole 94 in the bracket 75 and a threaded sleeve 95 cast-formed in the frame 89, in which the connecting bolt 92 engages. The sliding connection 91 also comprises a connecting bolt 96 with a packing washer 97, and a screw hole 98 in the bracket 75. The sliding connection 91 is formed in that a sliding guide 99 for a -a sliding member 101 provided with threaded hole 100 is provided in the frame 89 instead of a simple threaded sleeve. The sliding guide 99 with the sliding member 101 has the function of allowing the distance between the fixed point connection 90 and sliding connection 91 to shorten when the bracket 75 buckles, without the connecting bolts 92 and 96 breaking out of the backrest 72.

Figure 8:
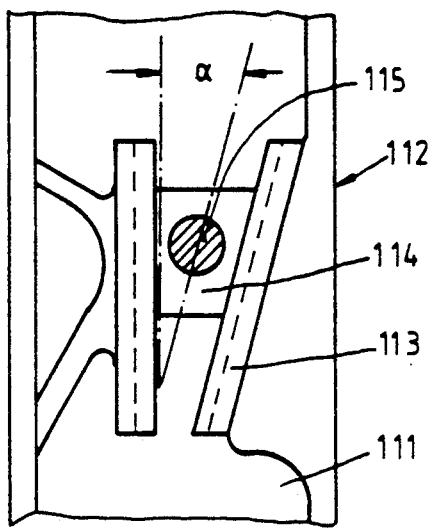

In FIG. 8, the T-shaped sliding guide 113, which is replaceably arranged in the frame 111 of the backrest 112, is inclined at an angle α of 15° relative to the longitudinal axis of the backrest 112 and narrows towards the bottom. The sliding member 114 is adapted to this wedge shape. The sliding guide 113 is integrally formed in the frame 111 manufactured from plastics material in an injection moulding process. The connecting bolt is designated by the reference number 115.

Figure 9:
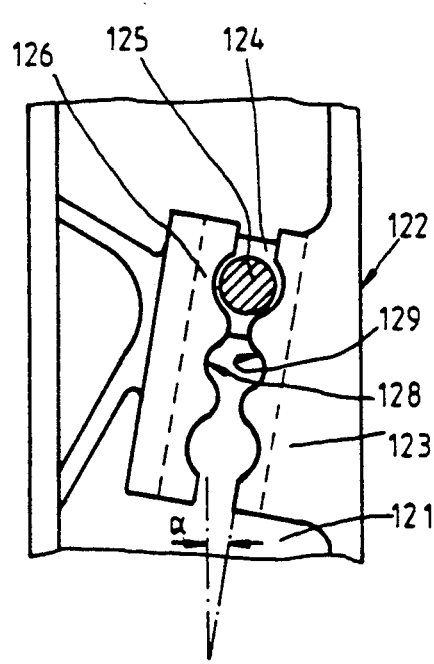

In FIG. 9, the sliding guide 123 arranged in the frame 121 of the backrest 122 is inclined at an angle of 10° relative to the longitudinal axis of the backrest 122. A sliding member 124, in which a connecting bolt 125 engages, is guided in the T-shaped sliding guide 123. In this case, the projecting legs 126, 127 securing the sliding member 124 comprise contours 128, 129, which cooperate with the connecting bolt 125.

Figure 10:
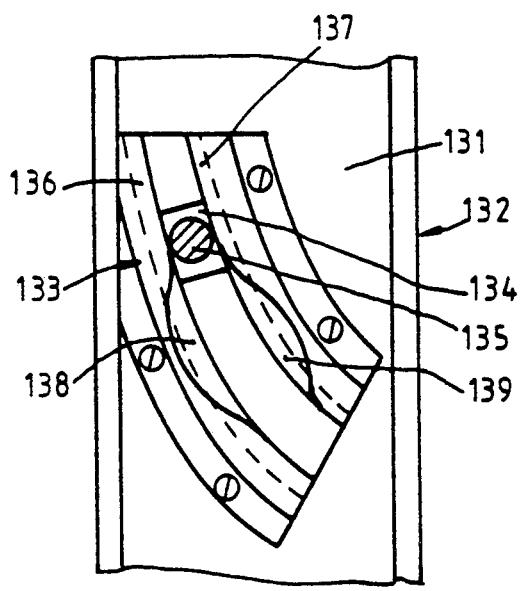

In FIG. 10, the sliding guide 133 arranged in the frame 131 of the backrest 132 is designed as a replaceable metallic component part. It is T-shaped and is curved in the shape of a circular arc. A correspondingly designed sliding member 134, in which the connecting bolt 135 engages, is guided in said sliding guide 133. The legs 136, 137 covering the sliding member 134 comprise reinforcing profiles 138, 139.

Figure 11:
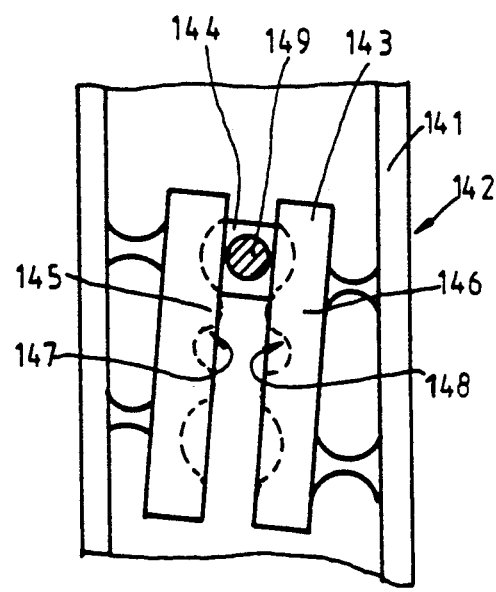

In FIG. 11, the sliding guide 143 arranged in the frame 141 of the backrest 142 is designed in such a manner that the sliding surfaces 145, 146 arranged to the right and left of the sliding member 144 comprise contours 147, 148.

We claim:

1. A vehicle seat comprising a lower seat and a backrest each including an interior frame and connected with one another by articulated joint fittings, the articulated joint fittings each comprising a lower seat bracket and a backrest bracket, each bracket having two longitudinally spaced apart through holes, connecting bolts guided through the holes and held in the interior frame, and at least one of the brackets of each articulated joint fitting having a fixed point connection and a sliding connection formed by the connecting bolts and the through holes in the bracket.

2. A vehicle seat according to claim 1, wherein the sliding connection is formed by a through hole designed as a slot.

3. A vehicle seat according to claim 1, wherein the sliding connection is formed in the backrest.

4. A vehicle seat according to claim 1, wherein the sliding connection is formed in the backrest and the connecting bolt of the sliding connection comprises a head designed as a sliding member.

5. A vehicle seat according to claim 1, wherein the sliding connection is formed by a through hole designed as a slot having a contour.

6. A vehicle seat according to claim 1, wherein the sliding connection is formed by a through hole designed as a slot and the bracket comprises a profiling.

7. A vehicle seat according to claim 1, wherein the sliding connection is formed by a through hole designed as a slot and a flaring element arranged on the connecting bolt guided in and through the slot.

8. A vehicle seat according to claim 1, wherein the sliding connection is formed by a through hole designed as a slot and a hard-elastic buffer arranged in the slot.

9. A vehicle seat according to claim 1, including a relief plate adjacent the brackets where the connecting bolts pass through the brackets.

* * * * *